(12) United States Patent
DeMartin et al.

(10) Patent No.: US 8,274,611 B2
(45) Date of Patent: Sep. 25, 2012

(54) SYSTEM AND METHODS FOR TELEVISION WITH INTEGRATED SOUND PROJECTION SYSTEM

(75) Inventors: Frank DeMartin, San Clemente, CA (US); David Naranjo, Chula Vista, CA (US); Jeffrey Whitelaw, Corona, CA (US); Peter Mortensen, Tustin, CA (US)

(73) Assignee: Mitsubishi Electric Visual Solutions America, Inc., Irvine, CA (US)

( * ) Notice: Subject to any disclaimer, the term of this patent is extended or adjusted under 35 U.S.C. 154(b) by 610 days.

(21) Appl. No.: 12/487,861

(22) Filed: Jun. 19, 2009

(65) Prior Publication Data

US 2010/0042925 A1    Feb. 18, 2010

Related U.S. Application Data

(60) Provisional application No. 61/076,564, filed on Jun. 27, 2008, provisional application No. 61/094,037, filed on Sep. 3, 2008.

(51) Int. Cl.
*H04N 5/50* (2006.01)
*H04N 5/60* (2006.01)
*H04R 5/02* (2006.01)

(52) U.S. Cl. ......... 348/738; 348/569; 381/303; 381/307

(58) Field of Classification Search .................. 348/738, 348/569; 381/61, 300, 303, 307; 345/440, 345/440.1

See application file for complete search history.

(56) References Cited

U.S. PATENT DOCUMENTS

| | | | | |
|---|---|---|---|---|
| 4,933,768 | A * | 6/1990 | Ishikawa et al. | 348/738 |
| 5,778,077 | A | 7/1998 | Davidson | |
| 5,812,688 | A * | 9/1998 | Gibson | 381/119 |
| 6,069,567 | A | 5/2000 | Zawilski | |
| 6,169,807 | B1 | 1/2001 | Sansur | |
| 6,584,201 | B1 | 6/2003 | Konstantinou et al. | |
| 6,977,653 | B1 * | 12/2005 | Cleary et al. | 345/440 |
| 7,103,187 | B1 | 9/2006 | Neuman | |
| 7,305,097 | B2 * | 12/2007 | Rosen et al. | 381/307 |
| 7,379,552 | B2 | 5/2008 | Neervoort et al. | |
| 7,501,994 | B2 | 3/2009 | Sato et al. | |
| 7,602,924 | B2 * | 10/2009 | Kleen | 381/61 |
| 2002/0171624 | A1 | 11/2002 | Stecyk et al. | |
| 2004/0013271 | A1 * | 1/2004 | Moorthy | 381/1 |
| 2004/0151325 | A1 | 8/2004 | Hooley et al. | |

(Continued)

FOREIGN PATENT DOCUMENTS

EP    1 921 890 A2    5/2008

(Continued)

*Primary Examiner* — Victor Kostak

(74) *Attorney, Agent, or Firm* — Dickstein Shapiro LLP; Kenneth S. Roberts

(57) ABSTRACT

Systems and methods that facilitate the use and operation of a television (TV) with an integrated sound projection system. The sound projector preferably comprises an array of speakers configurable to project beams that reflect off the walls and ceiling to create surround sound. In one embodiment, the user can use a graphical user interface-base menu system to move the sound beams around the viewing room while being presented with a graphical representation of the same. In another embodiment, a TV remote control unit can be equipped with a embedded microphone and microprocessor control to measure the audio level and transmit the level back to the TV to be used to automatically setup audio levels and delays in surround systems. In another embodiment, individual audio settings could be saved per each activity for a preferred viewing experience for a given activity.

14 Claims, 15 Drawing Sheets

U.S. PATENT DOCUMENTS

| | | |
|---|---|---|
| 2004/0252187 A1 | 12/2004 | Alden |
| 2005/0013443 A1 | 1/2005 | Marumoto et al. |
| 2005/0123143 A1 | 6/2005 | Platzer et al. |
| 2005/0152557 A1* | 7/2005 | Sasaki et al. .................... 381/58 |
| 2006/0125968 A1* | 6/2006 | Yokozawa et al. ............ 348/734 |
| 2006/0126878 A1 | 6/2006 | Takumai et al. |
| 2006/0140420 A1 | 6/2006 | Machida |
| 2006/0153391 A1* | 7/2006 | Hooley et al. .................... 381/17 |
| 2006/0204022 A1 | 9/2006 | Hooley et al. |
| 2007/0019831 A1 | 1/2007 | Usui |
| 2007/0097024 A1 | 5/2007 | Jung et al. |
| 2007/0153122 A1 | 7/2007 | Ayite et al. |
| 2007/0216805 A1 | 9/2007 | Yamamoto et al. |
| 2007/0263889 A1* | 11/2007 | Melanson ..................... 381/300 |
| 2007/0266412 A1 | 11/2007 | Trowbridge et al. |
| 2007/0296818 A1 | 12/2007 | Pouval |
| 2008/0031473 A1 | 2/2008 | Yarygin et al. |
| 2008/0095385 A1 | 4/2008 | Tourwe |
| 2008/0130918 A1 | 6/2008 | Kimijima |
| 2008/0165176 A1 | 7/2008 | Archer et al. |
| 2008/0278635 A1* | 11/2008 | Hardacker et al. ............ 348/734 |
| 2009/0010455 A1 | 1/2009 | Suzuki et al. |
| 2009/0034762 A1 | 2/2009 | Konagai et al. |
| 2009/0060237 A1 | 3/2009 | Konagai et al. |
| 2009/0290064 A1* | 11/2009 | Matsumoto et al. .......... 348/515 |
| 2009/0316938 A1* | 12/2009 | Matsumoto ................... 381/300 |

FOREIGN PATENT DOCUMENTS

| | | |
|---|---|---|
| JP | 2007-295425 A | 11/2007 |
| JP | 2007300404 A | 11/2007 |
| WO | WO 02/078388 A2 | 10/2002 |
| WO | WO 2005/086526 A1 | 9/2005 |
| WO | WO 2007/007083 A1 | 1/2007 |

* cited by examiner

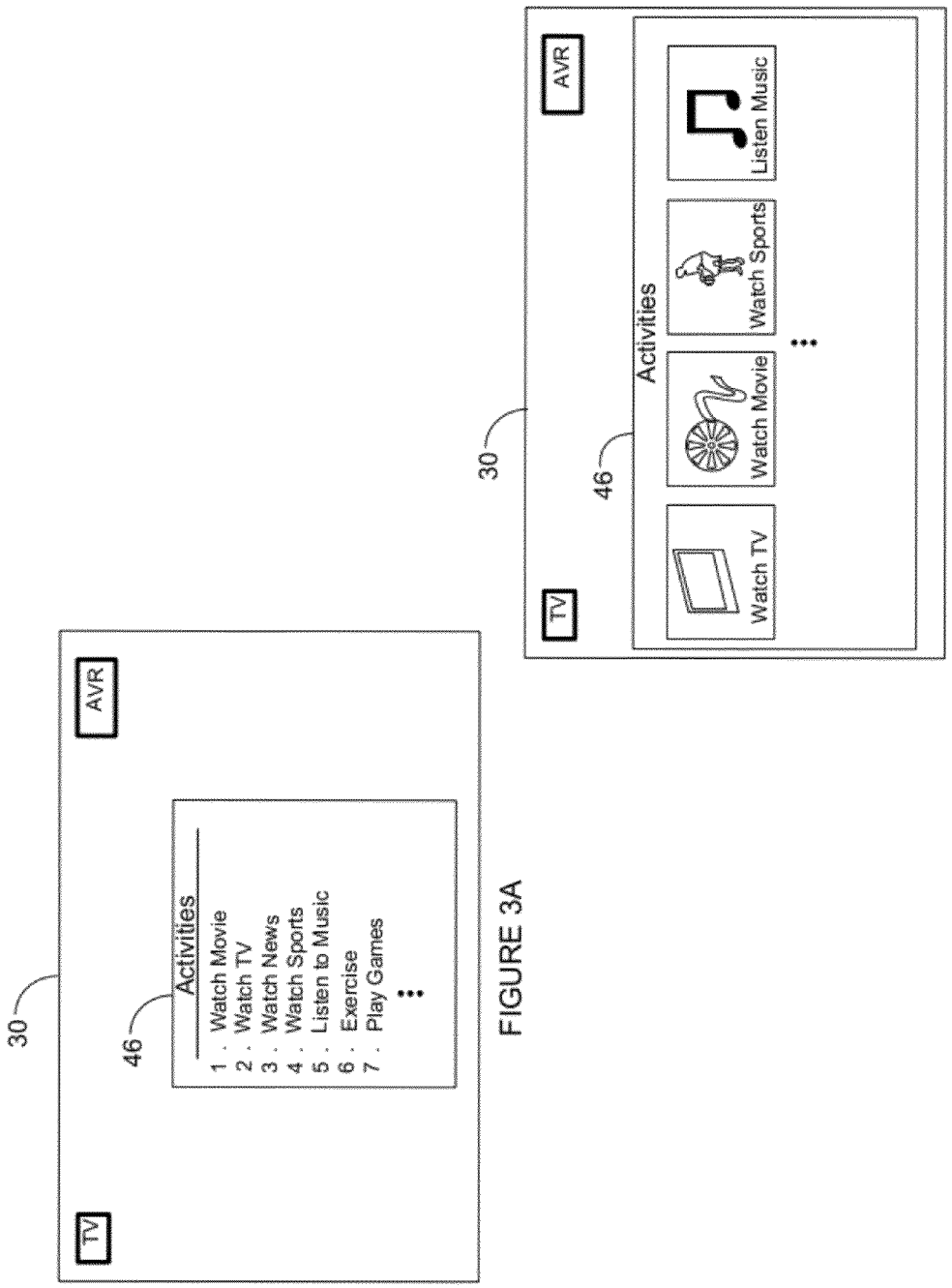

SYSTEM AND METHODS FOR TELEVISION WITH INTEGRATED SOUND PROJECTION SYSTEM

This application claims the benefit of provisional application Ser. No. 61/076,564 filed Jun. 27, 2008, and provisional application Ser. No. 61/094,037 filed Sep. 3, 2008, which are fully incorporated herein by reference.

BACKGROUND OF THE INVENTION

1. Field of the Invention

The invention relates generally to televisions and sound projection systems and more particularly to systems and methods that facilitate use and operation of a television with an integrated sound projection system.

2. Background Information

As the capabilities of the TV and other components increase and become more affordable, more and more consumers will seek a true surround sound. Surround sound generally refers to the application of multi-channel audio to channels "surrounding" the audience in some combination of left surround, right surround, and rear surround as opposed to "screen channels" such as center, front left, and front right. In 4.0 channel or higher surround, the system will typically include a center channel speaker, a left front channel speaker and a right front channel speaker, two or more surround channel speakers in the rear or rear and side, and a low frequency effect channel to drive a subwoofer. For example, in 5.1 channel surround, the system typically includes a center channel speaker, a left front channel speaker and a right front channel speaker, two surround channel speakers in the left rear and right rear, and a low frequency effect channel to drive a subwoofer.

Currently, a consumer needs a high end audio-video receiver (AVR) in order to drive the sound system speakers. The AVR includes a decoder that will, depending on the audio source, extract from the audio signal a number of channels corresponding to the number of available speakers or deliver a discrete number of audio channels corresponding to the available speakers. For example, in a 5.1 channel surround system, the decoder will, depending on the audio source, extract five audio channels and one LFE channel from either a specially encoded two-channel source or a stereo source and distribute to the five speakers and one sub-woofer or deliver five discrete audio channels and one LFE channel from a 6 channel source to the five speakers and one sub-woofer. However, for the consumer, the addition of an AVR component and multiple speakers adds another level of complexity to their home entertainment system, the control of which can often be fraught with frustration.

Recent advances in sound projection technology from 1 LTD of Cambridge, England, eliminates the need for an AVR component and multiple speakers positioned around the room and wire coupled or wireless coupled to the AVR. In accordance with 1 LTD's sound projection technology, beams of sound emanate from an array of speakers mounted in a single enclosure, i.e., a sound projector, into the room in which the sound projector is positioned and reflect off the walls and ceiling of the room creating surround sound within the room. In addition, the sound projector is capable of beaming one or more beams of sound to targeted locations within the room. See, e.g., EP1921890A2, US2006/0204022A2, WO02/078388A2, WO2007/007083A1 and US2004/0151325A1, which are incorporated herein by reference.

Currently, the sound projector is a stand alone component separate from the TV, with microprocessor control, and controllable by the user with a custom universal remote control unit with additional processor capabilities. Accordingly, it would be desirable to provide a TV with an integrated sound projection system that is controlled by the TV microprocessor control system and controllable and configurable by the user with a TV remote control unit on the TV layer of the remote control unit.

SUMMARY

The embodiments provided herein are directed to systems and methods that facilitate the use and operation of a television with an integrated sound projection system. In one embodiment, a television includes an integral sound projection system incorporating an array of speakers operable to create surround sound within a room and project one or more sound beams to targeted locations. The television preferably comprises audio and video input connections and audio-video outputs such as a sound projector and a video display screen coupled to a control system. The control system includes a micro processor and non-volatile memory upon which system control software is stored, an on screen display (OSD) controller coupled to the micro processor and the video signal input connections, an image display engine coupled to the OSD controller and the display screen. The control system further comprises an audio processor such as a digital sound processor coupled to the micro processor and the sound projector. The audio input connections preferably include conventional audio input connections. The sound projector preferably comprises an array of speakers configurable to inject beams of sound into a room in which the TV is located, which reflect off the walls and ceiling to create surround sound, and configurable to inject one or more targeted beams of sound into the room.

In operation, the user using the menu system and graphical user interface displayable on the screen of the TV and generated by the control system software, can select between different modes of operation including stereo, surround, mono targeted, dual targeted and the like, configure the sound projection system for the user viewing room and component configuration, and automatically calibrate or customize the sound beam parameters of the sound projection system using a microphone couplable to the control system or manually adjust the sound beam parameters by navigating the graphical user interfaced based menu system. Once the room, component and sound beam parameters are entered and stored in memory, the control system will draw graphical representations of the sound beams and display the graphical representations of the sound beams within a graphical representation of the user's viewing room on the TV screen. The user can further use the graphical user interfaced menu system to move the sound beams around the viewing room while being presented with a graphical representation of the same.

In another embodiment, individual audio settings could be saved per each activity for a preferred viewing experience for a given activity. For example, the user of a combination device providing gaming and movie capabilities (e.g., Playstation 3, XBOX360 and others) could have separate color audio settings for each activity such as "Play Game" and "Watch Movie".

In another embodiment, the television remote control unit can be equipped with an embedded microphone and microprocessor control to measure the audio level through the microphone that is embedded in the remote control unit. The remote controller can measure the audio level when it knows the exact sequence and timing of the test signals being output from the TV. It can then return the measurements back to the TV through special IR codes. The remote control with embedded microphone unit can be used to measure the audio level from the sound projector or discrete external surround speakers.

Other systems, methods, features and advantages of the invention will be or will become apparent to one with skill in the art upon examination of the following figures and detailed description.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

FIGS. 3A and 3B are schematics of the television screen showing alternative activity selection menus in a graphical user interface.

DETAILED DESCRIPTION

The systems and methods described herein are directed to a television (TV) with an integrated sound projection system and the control and operation of the TV and integrated sound projection system. More particularly, in one embodiment the TV includes an integral sound projector comprising an array of speakers operable to create surround sound within a room and project one or more beams to targeted locations. The array of speakers is configurable to inject beams of sound into a room in which the TV is located, which reflect off the walls and ceiling of the room to create surround sound. The array of speakers is also configurable to inject one or more beams of sound into the room and target the one or more beams to desired locations within the room. A detailed description of stand alone sound projectors and sound projection systems that are external to the TV, i.e., not integrally located within the TV, and couplable to a TV and the operation of such sound projectors and sound projector systems are described in EP1921890A2, US2006/0204022A2, WO02/078388A2, WO2007/007083A1 and US2004/0151325A1, which are incorporated herein by reference.

Figure 1A:
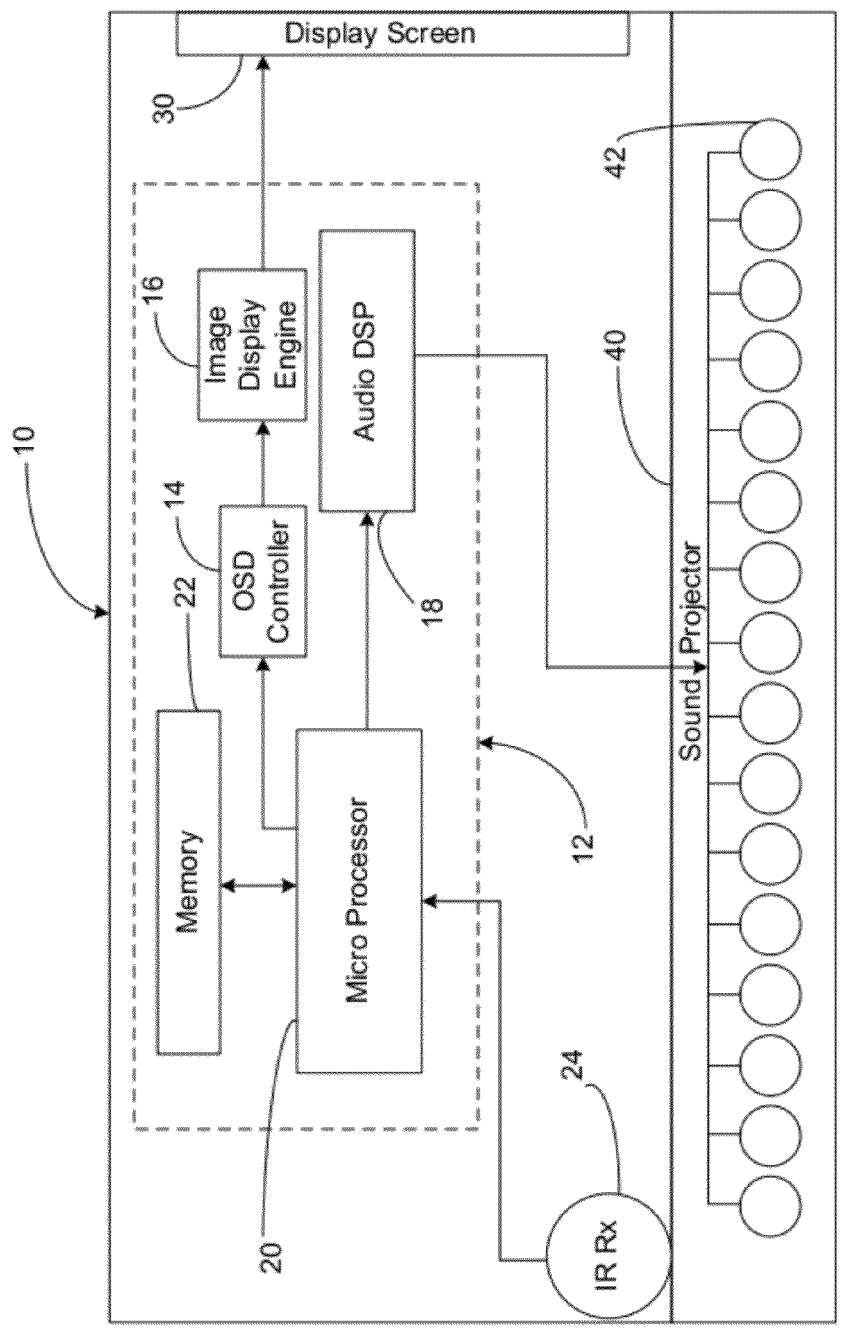
FIG. 1A depicts a schematic of a television with an integrated sound projector and control system.
Figure 1B:
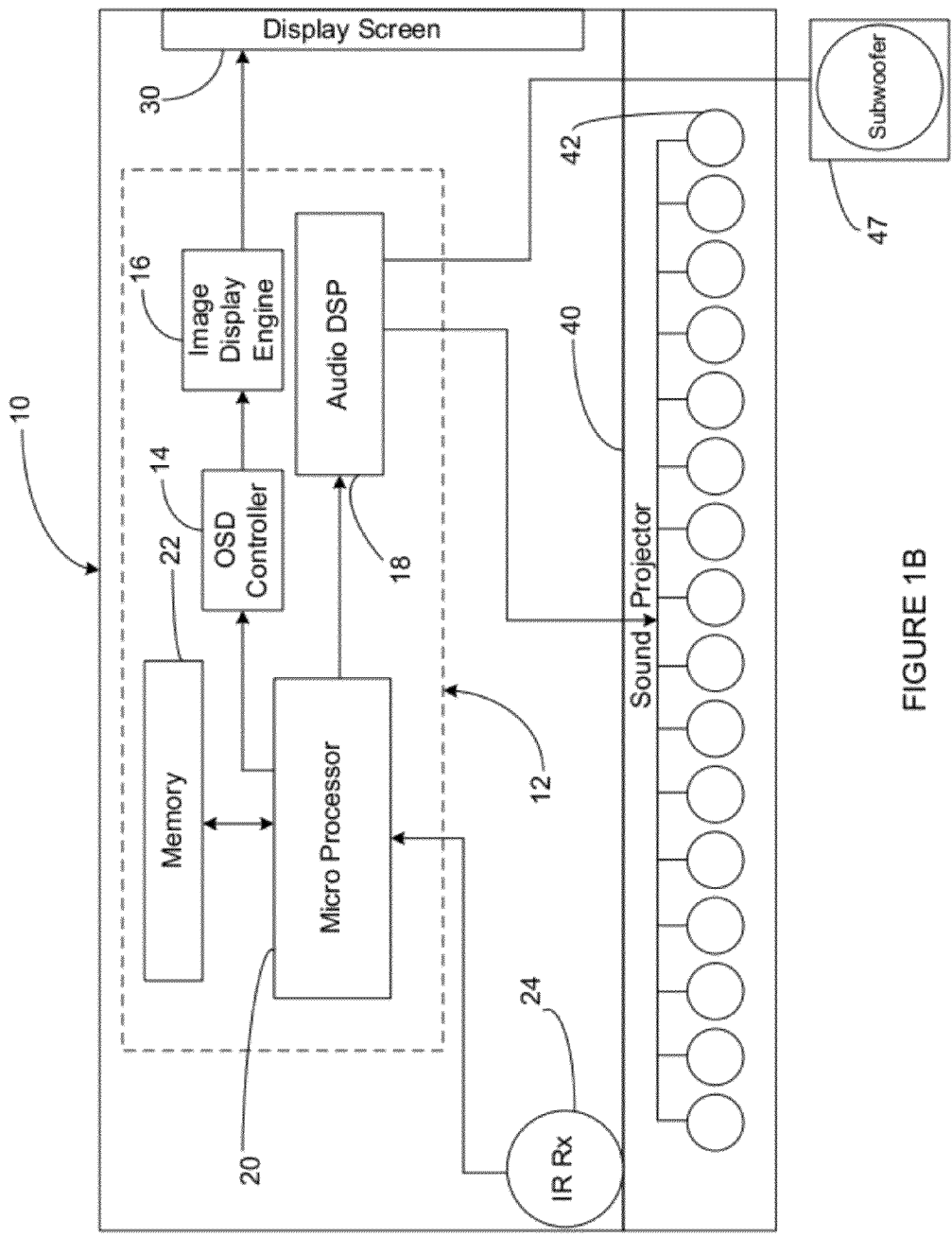
FIG. 1B depicts a schematic of an alternate embodiment of television with an integrated sound projector, a control system and a subwoofer coupled to the television.

Turning in detail to the figures, FIG. 1A depicts a schematic of an embodiment of a TV 10 with an integral sound projector 40 comprising an array of speakers 42. FIG. 1B depicts a schematic of an alternative embodiment comprising a subwoofer coupled to a control system of the TV 10. As shown in FIGS. 1A and 1B, The TV 10 preferably comprises a video display screen 30, an IR signal receiver 24 and the sound projector 40 coupled to a control system 12. The control system 12 preferably includes a micro processor 20 and non-volatile memory 22 upon which system software as well as system information and information and data entered by an user is stored, an on screen display (OSD) controller 14 coupled to the micro processor 20 and an image display engine 16 coupled to the OSD controller 14 and the display screen 30. The control system 12 further comprises an audio processor 18, such as an audio digital sound processor (DSP) or the like, coupled to the micro processor 20 and the sound projector 40 and optionally a subwoofer 47.

The system software preferably comprises a set of instructions that are executable on the micro processor 20 and/or the audio processor 18 to enable the setup, operation and control of the TV 10 including the setup, operation and control of the sound projector 40. The system software provides a menu-based control system that is navigatable by the user through a graphical user interface displayed or presented to the user on the TV display 30. While on the TV layer of the TV remote control unit, the user can navigate the graphical user interface to setup, operate and control the TV 10, its integral sound projector, and external A-V input devices, such as, e.g., a DVD, a VCR, a cable box, and the like, coupled to the TV 10. A detailed discussion of a graphical user interface-based menu control system and its operation is provided in U.S. Published Patent Application No. US 2002-0171624 A1, which is incorporated herein by reference.

In operation, the user using the menu system and graphical user interface displayable on the display screen 30 of the TV 10 and generated by the system software executed on the micro processor 20, can select between different modes of audio operation including stereo, surround sound, targeted single or mono sound beam, targeted dual sound beams and the like. Using the graphical user interface based menu system, the user can also configure the sound projection system in accordance with the user's viewing room parameters such as room dimensions, TV location, distance of couch or main seating area from the TV, which parameters are stored in memory 22. Once the sound projection system is configured in accordance with the user's viewing room parameters, the user can select to automatically calibrate the sound beam levels using a microphone couplable to the control system. Alternatively, the user can navigate the graphical user interface based menu system to adjust the sound beam parameters such as sound beam levels and angels. Once the viewing room and sound beam parameters are entered or received by the control system, the control system will draw graphical representations of the sound beams and display the graphical representations of the sound beams within a graphical representation of the user's viewing room on the TV display screen 30. The user can further use the graphical user interfaced menu system to adjust the angles of the sound beams and move the sound beams around the viewing room while being presented with a graphical representation of the same.

Figure 2A:
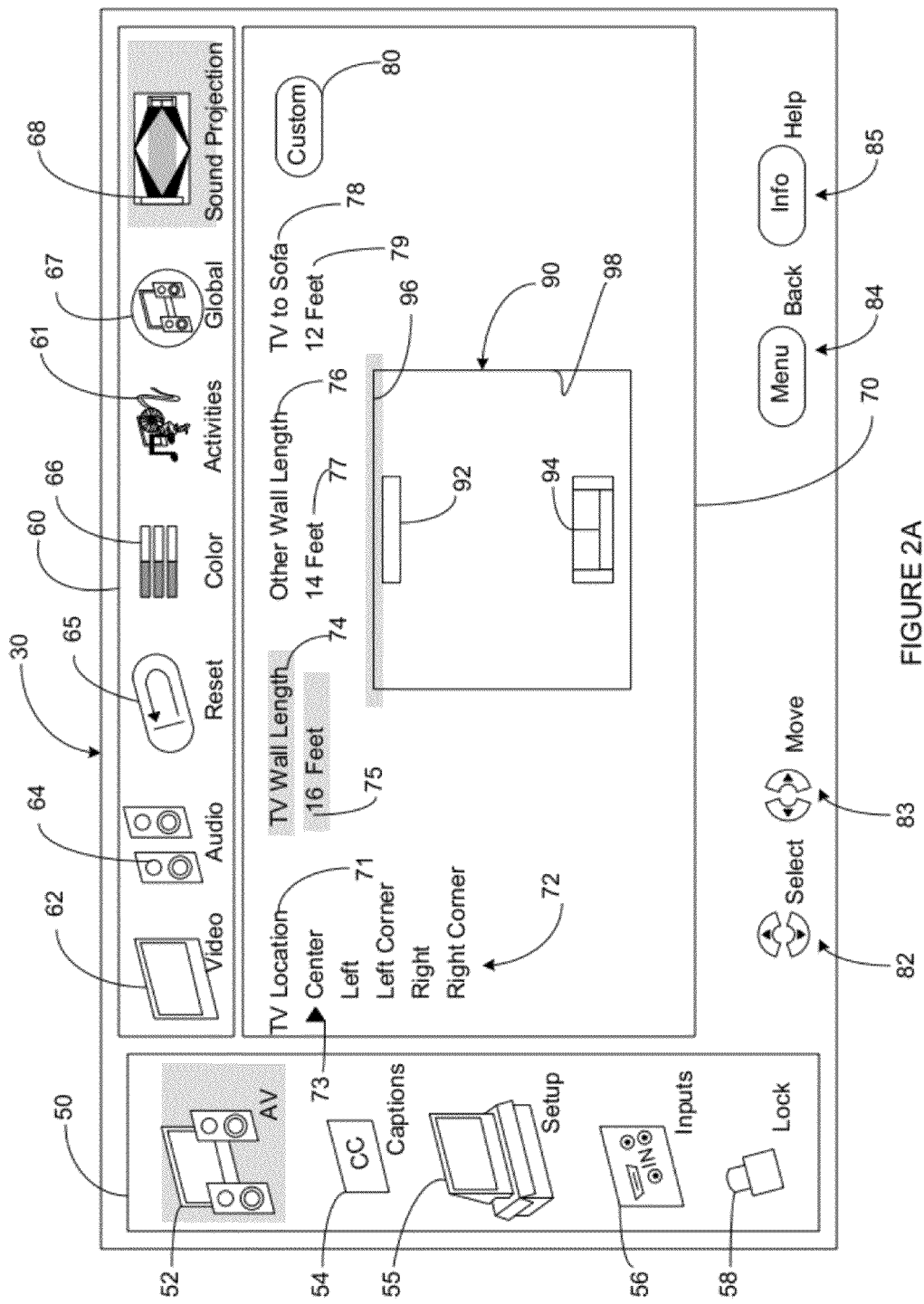
FIG. 2A depicts a graphical user interfaced based menu displayed on the screen of the television with the sound projector configuration menu displayed.

Turning to FIG. 2A, configuring the sound projection system using the TV's graphical user interfaced-based multi-layer menu system, which prompts users to make selections among graphical icons and menu items and input textual information, will be discussed. Upon pressing the menu key on a control panel on the TV 10 or on a remote control unit, the user is presented with a system configuration menu 50 preferably along the left side of the screen 30. The configuration menu 50 preferably comprises and, thus, prompts the user to make a selection among a plurality selectable graphical icons representing menu options corresponding to functions and/or devices the user can configure such as, e.g., AV devices 50, captions 54, "out of the box" system setup 55, input devices 56 and security systems 58. The user is also presented with a navigation key or guide indicating which keys to press on the remote control to accomplish navigation functions such as "select" 82, "move" 83, "back" 84 and "help" 85. Highlighting, as depicted using gray shading about the icon for the AV device 52 menu option, is used to indicate location within a menu and selected menu item.

Upon selecting the AV device 52 menu option in the system configuration menu 50, a device configuration menu 60 is preferably displayed along the top of the screen 30. The device configuration menu 60 preferably includes and, thus, prompts the user to make a selection among a plurality selectable graphical icons representing menu options corresponding to functions or devices such as, e.g., video 62, audio 64, reset 65, picture color 66, internet 67, sound projection 68 and the like.

Upon selecting the sound projection 68 menu option in the device configuration menu 60, a sound projection system configuration menu 70 is displayed in the central portion of the screen 30 prompting the user to select and enter viewing room parameters, which are needed by the system software to configure the projection sound system to inject sound beams into the viewing room and reflect the sound beams off the walls and ceiling to create surround sound. The sound projection system configuration menu 70 includes an image 90 comprising a graphical representation of the user's TV viewing room, and a list of the viewing room parameters such as, e.g., TV location 71, TV wall length 74, other wall length 76 and distance from the TV to a sofa or primary seating area 78. As depicted in the image of the viewing room 90, the TV wall length parameter 74 refers to the length of a wall in the user's TV viewing room corresponding to the wall 96 that the TV 92 is depicted as positioned on, the other wall length parameter 76 refers to the length of a wall in the user's TV viewing room corresponding to the wall 98 that the TV 92 is not depicted as positioned on, and the TV to sofa parameter 78 refers to the distance between a TV and a sofa or primary viewing area in the user's TV viewing room corresponding to the TV 92 and sofa 94 as depicted in the image of the viewing room 90.

In operation, the user is first prompted to input or select the TV location 71. As the selector indicator arrow 73 is moved from one TV location option 72 to another, the TV 92 is preferably depicted at the selected position 72 along wall 96 in the image of the viewing room 90. The user can navigate between the viewing room parameters and be prompted to enter parameter values 75, 77 and 79, or be prompted in succession to enter values for TV Wall length 74, other wall length 76, and TV to sofa distance 78.

With the room parameters entered by the user and received by the control system 12 and stored in memory 22, the system software calculates the beam angles for surround sound beams such as, e.g., front right, front left, center, rear right and rear left beams, to emanate from the speaker array 42 of the sound projector 40 and orients or configures the individual speakers of the speaker array 42 accordingly.

Figure 4A:
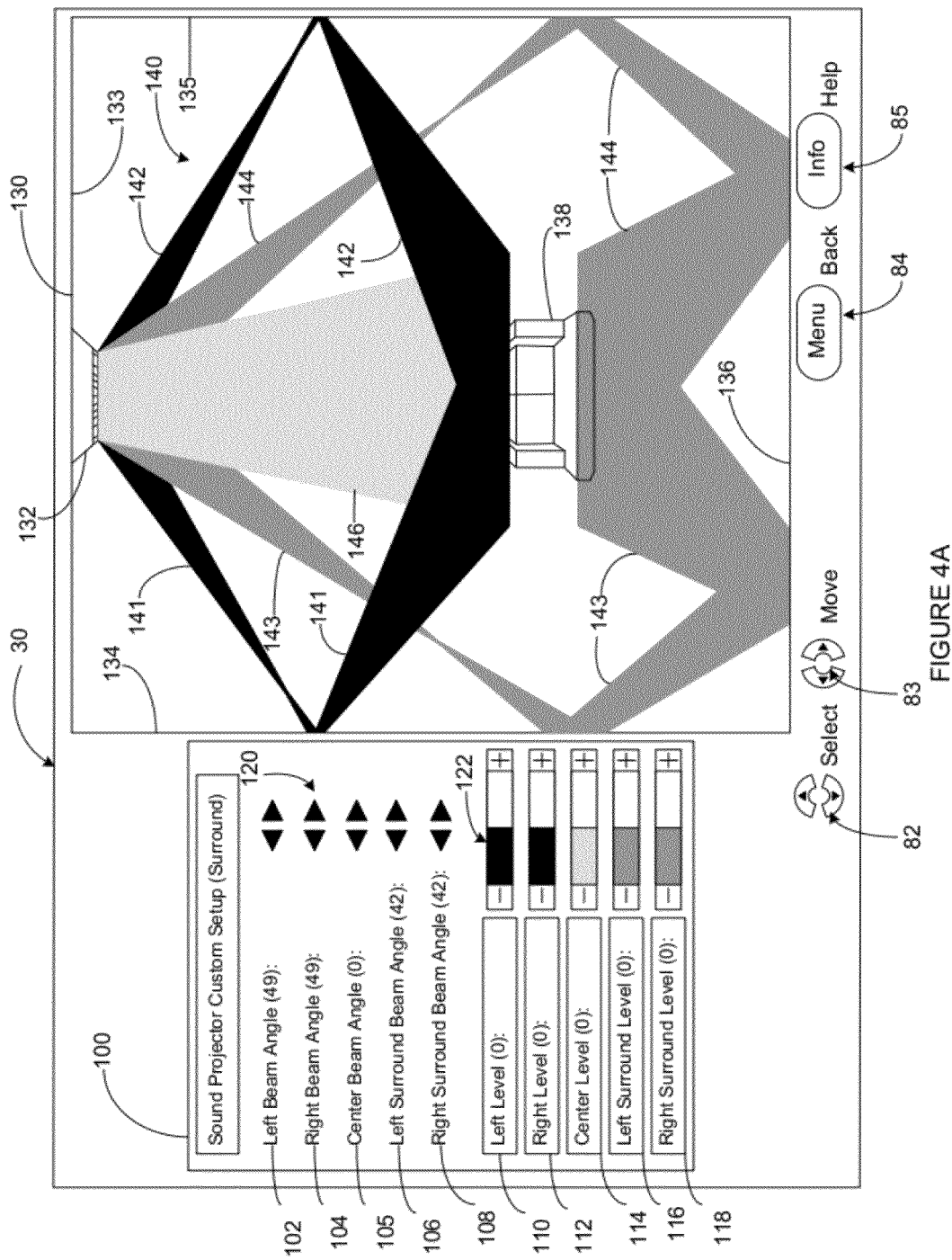
FIG. 4A depicts a graphical user interfaced based menu displayed on the screen of the television with the sound projector surround mode custom setup menu displayed with a graphical tracing of the paths of the sound beams displayed.

By selecting the soft key 80 labeled "custom" in the sound projection configuration menu 70, the user is presented, as depicted in FIG. 4A, with graphical traces 140 of the paths the sound beams will follow or follow in the TV viewing room. The traces 140 corresponding to, e.g., a front left sound beam 141, a front right sound beam 142, a center sound beam 146, a rear left sound beam 143, and a rear right sound beam 144 of surround sound, are displayed on the screen 30 in an graphical image 130 representing the TV viewing room with a front or TV wall 133, a back wall 136, side walls 134 and 135, a TV 132 positioned along the TV wall 133 and a couch 138 positioned within the image 130 of the TV viewing room in spaced relation with the TV 132.

As one skilled in the art would readily understand, audio sound beams reflect off the walls of the TV viewing room following the general law of reflection in physics of "angle of incidence equals angle of reflection". The function within the system software that draws the traces 140 includes a loop that draws each segment of a sound beam as a polygon. The corner points of the polygon are calculated through a "point bounce" function that finds the points where a straight line will bounce when shooting the line from a particular point in at a particular angle in a room of particular dimensions, and then uses the law of reflection to return the bounce angles on the room walls. Each side of the beam is calculated separately, but when drawn on the screen the two side lines of a beam represents four end points of a beam polygon.

Representative software code corresponding to the "point bounce" function preferably includes:

```
while (drawing beam segments)
{
    If (beam segment starts above sofa)
    {
        If (beam segment hits sofa)
        {
            Draw polygon of beam to stop at sofa level (from top);
        }
        else
        {
            Draw polygon of beam to hit next bounce points on wall.
            If (beam hits corner of room)
            {
                Terminate further beam drawing, illegal
```

-continued

```
            reflection;
        }
    }
}
else //beam segment starts below sofa
{
    If (beam segment hits sofa)
    {
        Draw polygon of beam to stop at sofa level (from
        bottom);
    }
    else
    {
        Draw polygon of beam to hit next bounce points
        on wall;
    }
}
Beginning of next beam segment is set equal to end of previous beam
segment;
}
The "sofa level" is the horizontal line of where the sofa is.
```

Figure 4B:
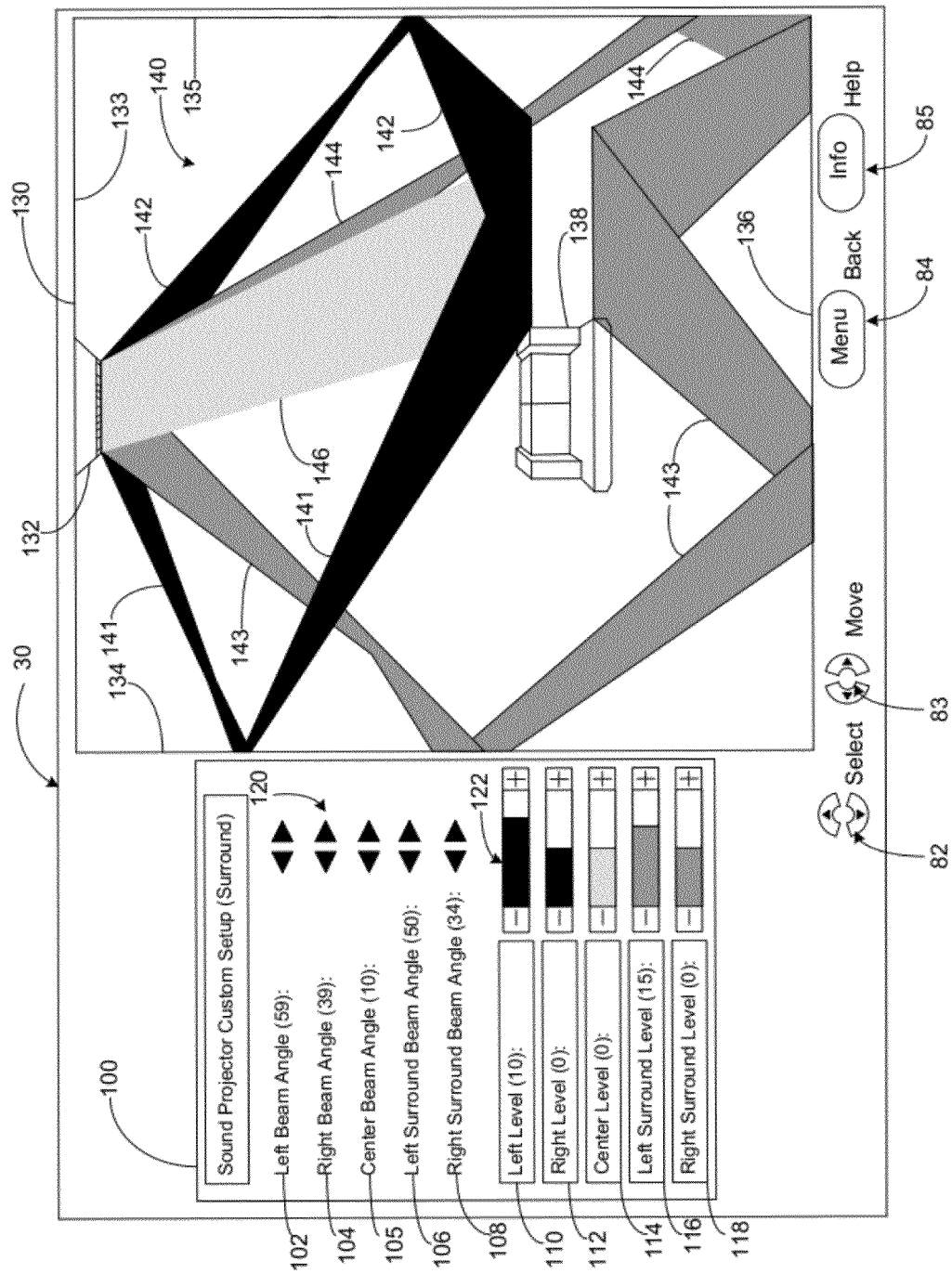
FIG. 4B depicts a graphical user interfaced based menu displayed on the screen of the television with the sound projector surround mode custom setup menu displayed with a graphical tracing of the paths of the sound beams displayed as modified by the user.

In order to efficiently draw the polygons and display the polygons on the screen 30 as shown in FIG. 4A and move them about the room as depicted in FIG. 4B in response to a user depressing the right or left cursor keys 83 on the remote control, the registers of the sound processor 18 are synchronized with the electronic key of the remote control. Process for controlling the synchronization of the sound processor registers with the key of the remote control includes translating the electronic key of the remote control into a two's complement number used directly in setting up and controlling the registers for each of the discrete channels in the sound processor. The keys are interpreted in real time such that when a user presses a left or right cursor key on the remote control, the bits from the electronic key of the remote control are converted into two's complement number which is then generated and sent to the sound processor 18 to synchronize the discrete channel.

The method for efficiently rendering polygons is based on the electronic key repeats of the remote control. Efficiently rendering multiple polygons on the display screen 30 to simulate sound beam reflections requires the methods of flipping the pixel images to transparency and back to a specific color and location such that the polygon images appear to be in a new pixel location and, thus, appear to be moving along the display screen 30, with each iteration. Converting the image to transparency provides a clean base for the next iteration. The method for efficiently rendering polygons is effectively an internal iterator that is controlled by electronic key rate of the remote control. The faster the rate the faster the images are converted to transparency to provide a clean base for the next iteration and rendering.

Turning back to FIGS. 4A and 4B, the user can select the "custom" soft key 80 in the sound projection configuration menu 70 (FIG. 2), to view and adjust the approximate angles of the sound beams as represented by the graphical polygon traces 140. As depicted, a sound projector setup menu 100 is displayed on the screen 30 along with the image 130 of the TV viewing room containing graphical polygon traces 140. The sound projector setup menu 100 includes selectable menu options with current value settings indicated that correspond to the left beam angle 102, the right beam angle 104, the center beam angle 105, the left surround beam angle 106, and the right surround beam angle 108. The value of each beam angle can be adjusted by pressing the right or left cursor keys 83 on the remote control as indicated by menu key or guide 120. As the cursor keys 83 are pressed, the indicated angle value of the selected menu option will change as well as the angle and, thus, position of the corresponding polygon trace, the results of which are depicted in FIG. 4B, enabling the user to visually move the sound beams around the room to approximate locations.

In addition, the sound projector setup menu 100 includes selectable menu options with current value settings indicated that correspond to the sound level of left beam 110, the right beam 112, the center beam 114, the left surround beam 116, and the right surround beam 118. The level of each beam can also be adjusted by using the sliders 122.

Figure 2B:
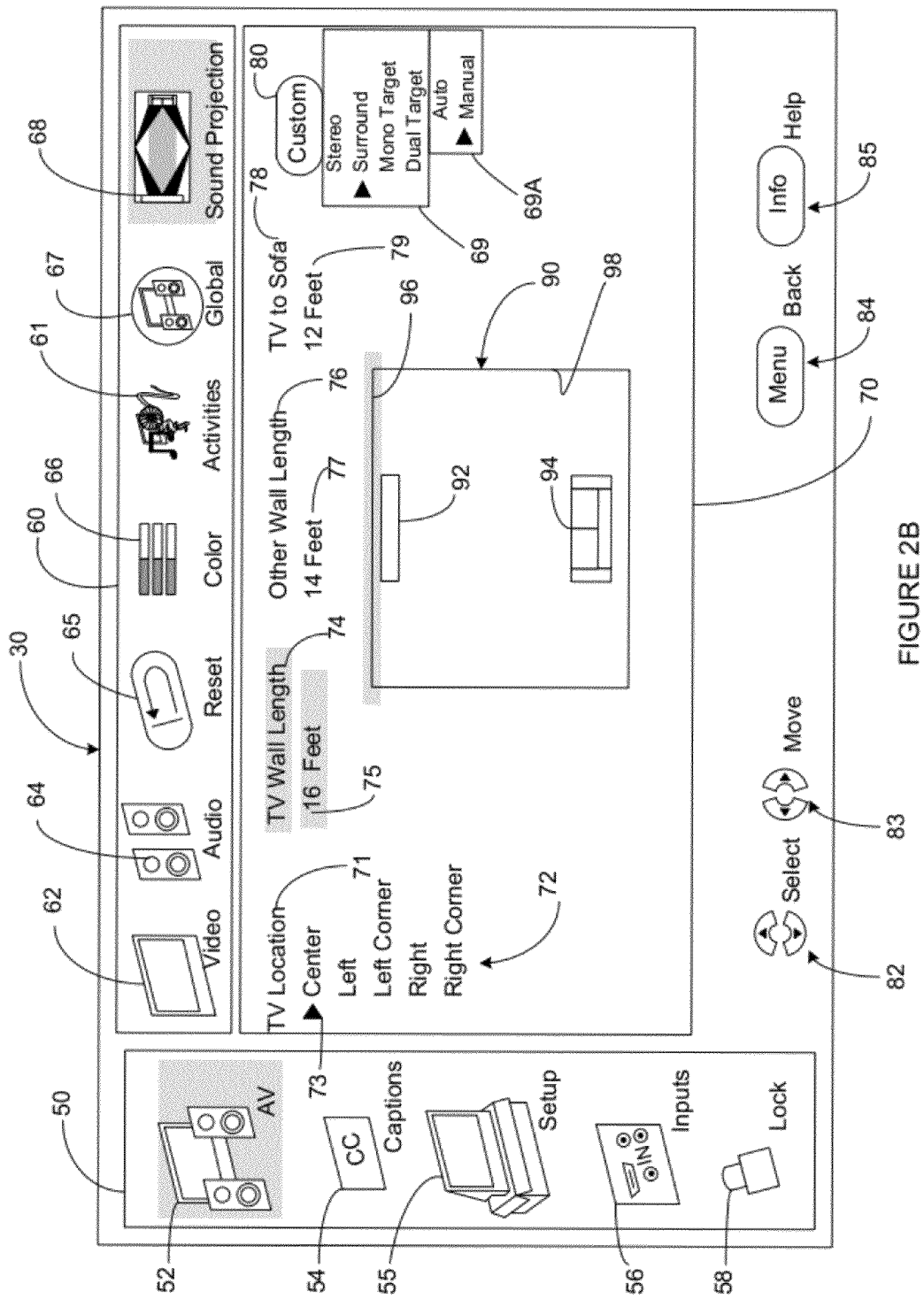
FIG. 2B depicts a graphical user interfaced based menu displayed on the screen of the television with the sound projector configuration menu and custom soft key drop down menu displayed.

As graphically depicted in FIGS. 4A, 4B, 5, 6 and 7, the TV 10 with integral sound projector 40 can operate in a variety of audio modes including surround, stereo and single or multiple targeted beams. As depicted in FIG. 2B, when the "custom" soft key 80 is selected, an audio mode configuration drop down menu 69 or the like is displayed prompting the user to select an audio mode of operation to configure such as, e.g., stereo, surround, mono target, dual target and the like. Once an audio mode is selected, an auto/manual drop down menu 69A or the like is displayed prompting the user to select automatic or manual configuration of the selected audio mode of operation. If the "automatic" option is selected, the sound beam levels will automatically be calibrated as discussed below based on the current viewing room and beam parameter settings. If the "manual" option is selected, a sound projection custom setup menu and TV viewing room image will be displayed on the screen 30 prompting the user to adjust the beam angle and/or beam level as depicted in and discussed above with regard to FIGS. 4A and 4B.

Figure 2C:
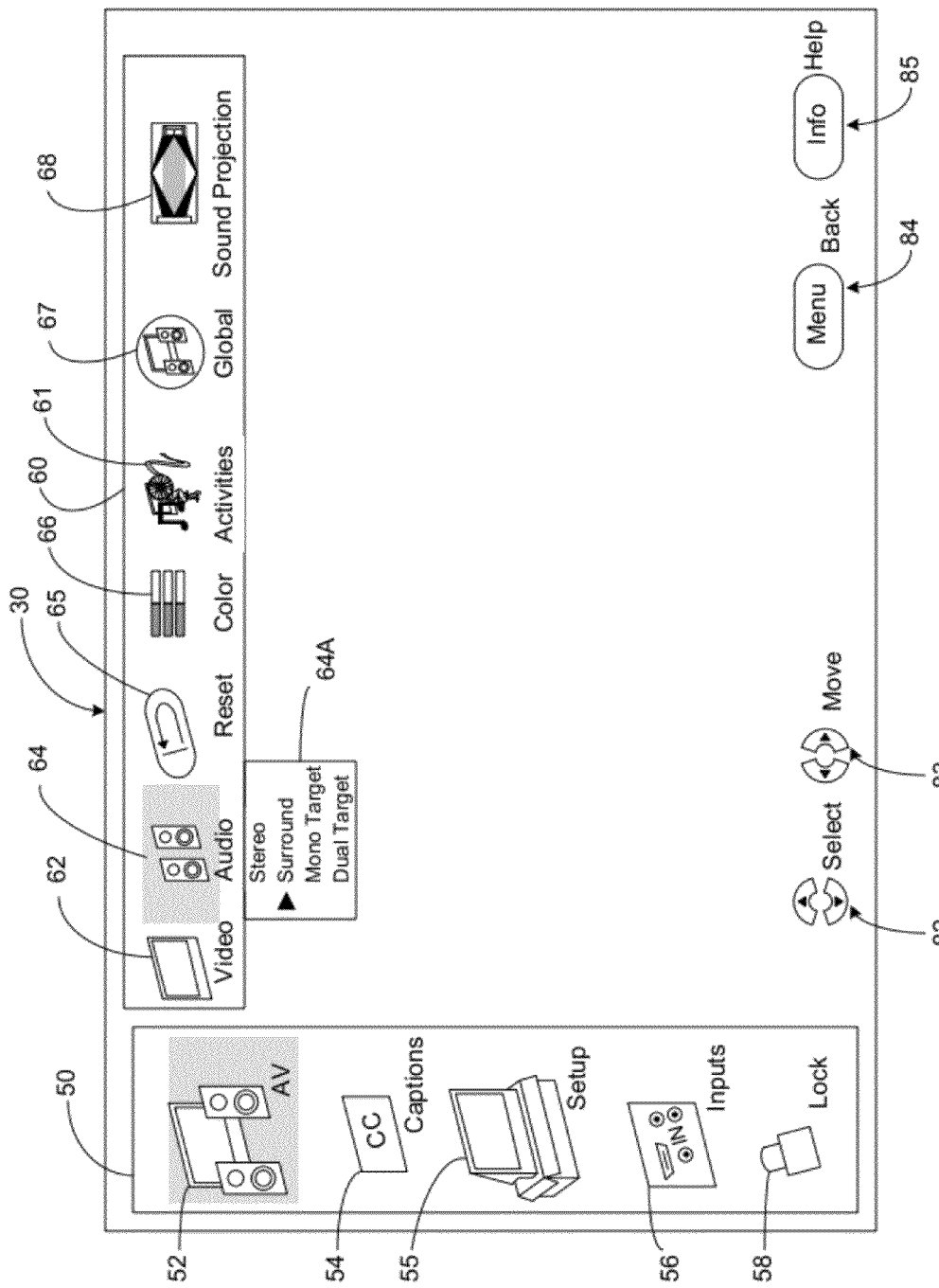
FIG. 2C depicts a graphical user interfaced based menu displayed on the screen of the television with the audio mode drop down menu displayed.

As depicted in FIG. 2C, the user can select an audio mode of operation by selecting the Audio icon 64 in AV device configuration menu 60. When Audio icon 64 is selected, an audio mode selection drop down menu 61 or the like is displayed prompting the user to select a desired audio mode of operation such as, e.g., stereo, surround, mono target, dual target and the like. Adjustment of the audio mode settings can be made by returning to the sound projection configuration menu 70 and selecting the custom soft key 80.

Figure 5:
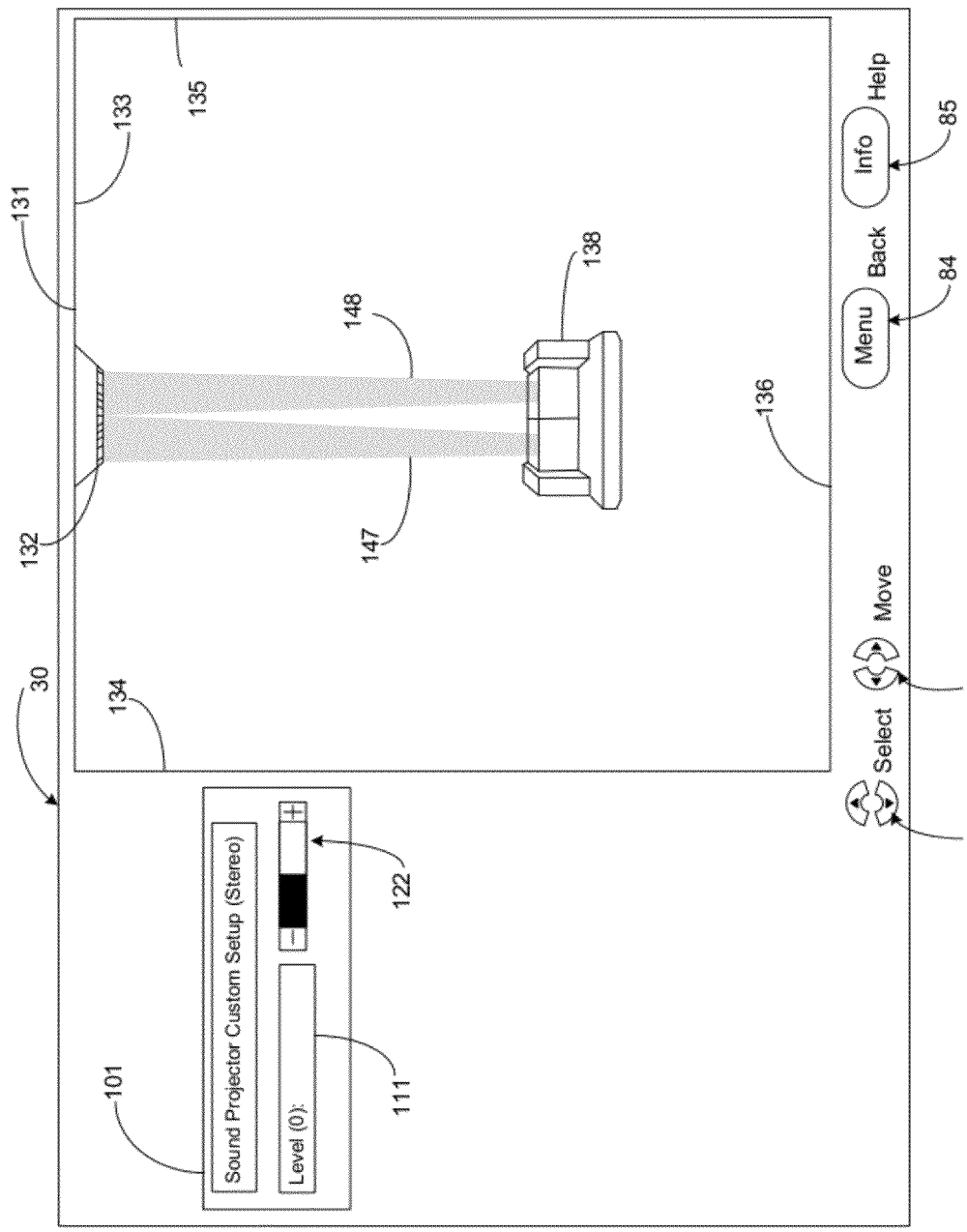
FIG. 5 depicts a graphical user interfaced based menu displayed on the screen of the television with the sound projector stereo mode custom setup menu displayed.

If, as depicted in FIG. 2B, the custom soft key 80 is selected and manual configuration of the stereo mode is selected from the audio mode configuration menus 69 and 69A, a sound projector custom setup menu 101 for stereo mode and a TV viewing room image 131 graphically depicting left and right stereo beams 147 and 148 emanating from the sound projector of the TV 132 are displayed on the screen 30 as depicted in FIG. 5. As depicted, the sound projector custom setup menu 101 preferably only includes a menu option corresponding to the sound level 111 of the stereo sound beams 147 and 148, which can be adjusted with slide 122. Alternatively, the sound projector custom setup menu 101 can include a beam angle adjust menu option to adjust the angle of the stereo sound beams 147 and 148 to move beams around the room.

Figure 6:
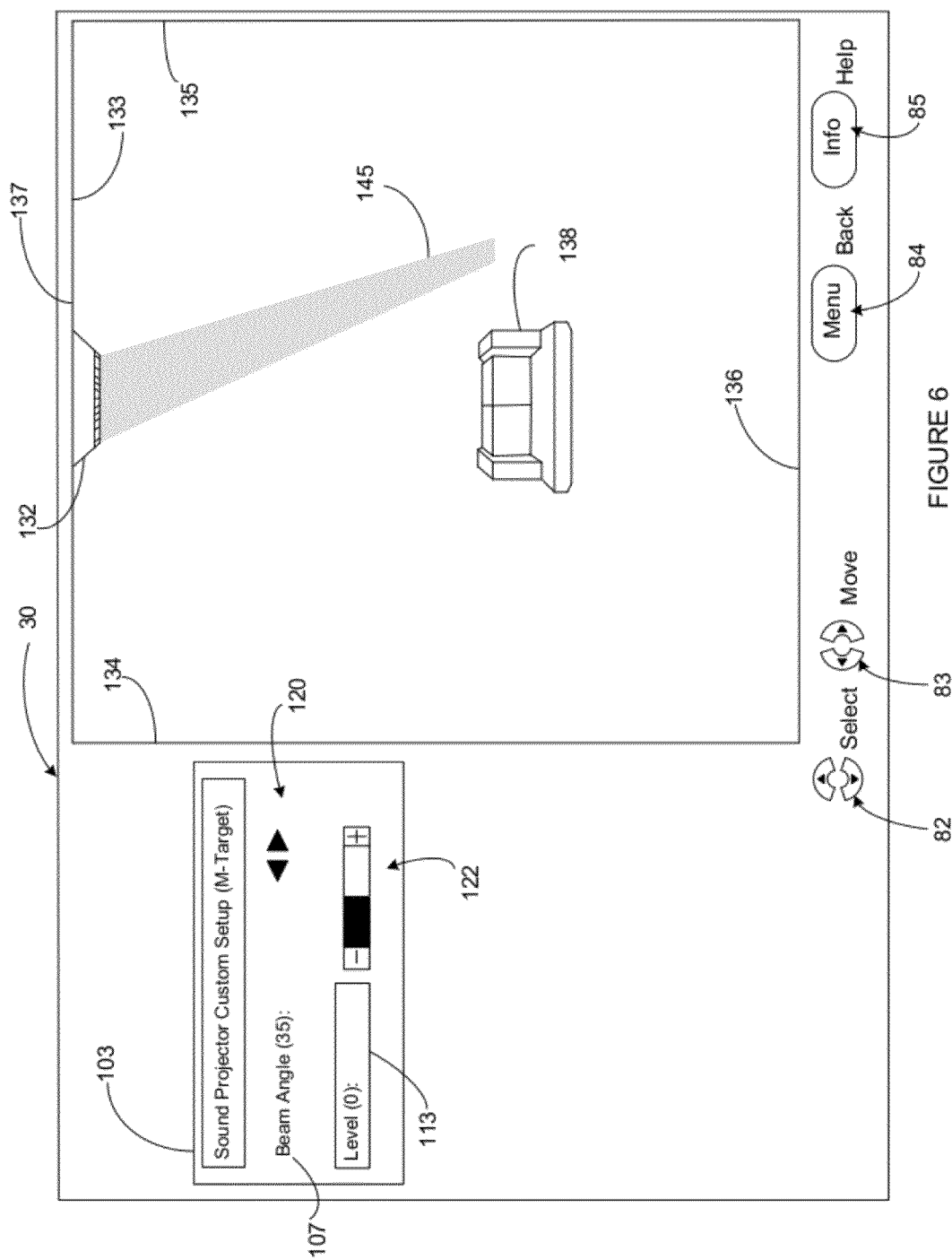
FIG. 6 depicts a graphical user interfaced based menu displayed on the screen of the television with the sound projector mono-target mode custom setup menu displayed.

If the custom soft key 80 is selected and manual configuration of the single or mono target beam mode is selected from the audio mode configuration menus 69 and 69A, a sound projector custom setup menu 103 and a TV viewing room image 137 graphically depicting a single or mono sound beam 145 emanating from the sound projector of the TV 132 are displayed on the screen 30 as depicted in FIG. 6. As depicted, the sound projector custom setup menu 103 preferably includes a menu option corresponding to a beam angle 107 of the mono beam. As indicated, the beam angle value can be adjusted to move the mono sound beam around the room to approximate targeted locations within the room. In addition, the sound projector custom setup menu 103 preferably includes a menu option corresponding to the sound level 113 of the mono beam, which can be adjusted with slide 122.

Figure 7:
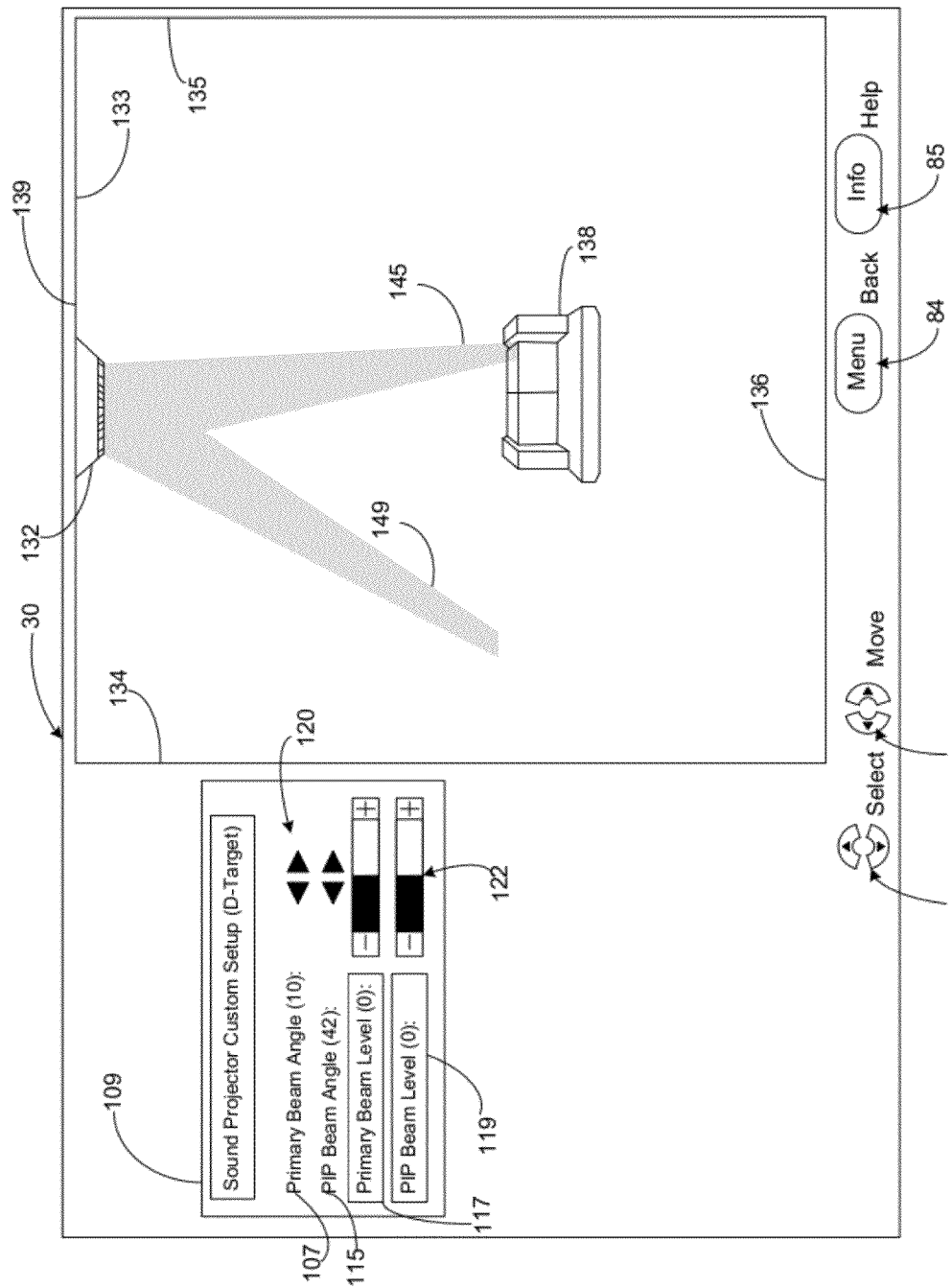
FIG. 7 depicts a graphical user interfaced based menu displayed on the screen of the television with the sound projector dual-target mode custom setup menu displayed.

If the custom soft key 80 is selected and manual configuration of the dual target beam mode is selected from the audio mode configuration menus 69 and 69A, a sound projector custom setup menu 109 and a TV viewing room image 139 graphically depicting two or dual sound beams 145 and 149 emanating from the sound projector of the TV 132 are displayed on the screen 30 as depicted in FIG. 7. As depicted, the sound projector custom setup menu 109 preferably includes menu options corresponding to beam angles 107 and 115 of the two beams 145 and 149. As indicated, the beam angle value can be adjusted to move the two sound beams around the room to approximate targeted locations within the room. As suggested by the use of the term PIP in the menu, the dual beam mode can be used to allow two viewers to watch picture-in-picture or split screen video with the one beam or the primary sound beam 145 being assigned to the main picture or one of the pictures in the split screen and the other beam or PIP sound beam 149 being assigned to the PIP or other picture in the split screen.

In addition, the sound projector custom setup menu 109 preferably includes menu options corresponding to the sound levels 117 and 119 of the two beams, which can be adjusted with the slide 122.

Figure 2D:
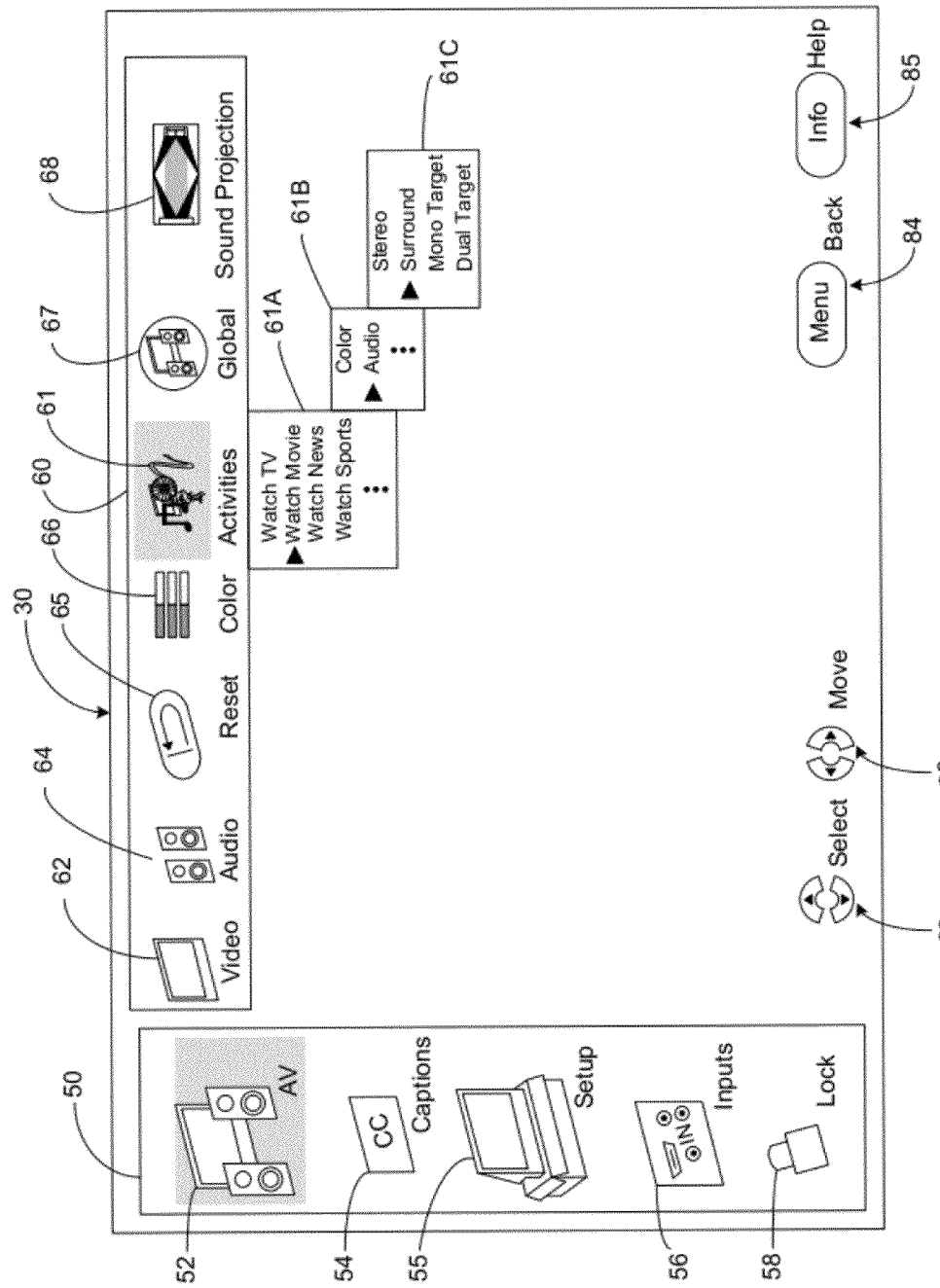
FIG. 2D depicts a graphical user interfaced based menu displayed on the screen of the television with a activities drop down menu displayed.

In another embodiment, preferred audio settings can be assigned and saved in memory to different viewing experiences or activities. For example, activities such as "Watch TV", "Watch Movie", "Watch News", "Watch Sports", "Play Games", etc. As depicted in FIG. 2D, the user can assign an audio mode of operation (such as stereo, surround, mono target, duel target) to a particular activity by selecting the Activities icon 61 in the AV device configuration menu 60. When Activities icon 61 is selected, an activities selection drop down menu 61A or the like is displayed prompting the user to select a desired activity. If, e.g., "Watch Movie" is selected, an activity configuration drop down menu 61B or the like is displayed prompting the user to select a viewing or a listening option, or the like, to configure for the selected activity. If the audio option is selected, an audio mode selection drop down menu 61C or the like is displayed prompting the user to select a desired audio mode of operation which is saved in memory and assigned to the selected activity. If, e.g., "surround" mode is selected, the control system of the TV will cause the audio to be output in surround sound for the selected activity.

Such viewing activities can be presented, as depicted in FIGS. 3A and 3B, in an activities menu 46 on the TV display screen 30 or on a remote control display screen to prompt a user to select an activity selection, by selecting a dedicated activities or task key on a control panel on the TV or on a remote control. When a particular activity is selected, the control system of the TV causes the audio to be output in the mode assigned to the particular activity. Preferably, by selecting a particular activity the TV and connected device associated with the particular activity such as, e.g., a DVD for watching a moving, will automatically turn-on and implement preferred connections and settings for the activity selected. For example, if "Watch Movie" is selected, the followings actions will take place:

1. Blueray player is powered on;
2. TV is on and Blueray player is selected as input source;
3. Movie video settings such as audio mode are applied and the sound is outputted in the assigned mode.

Saving and assigning the audio mode of operation to particular activities is particularly useful where a multi-mode device like a media center PC, Playstation 3, XBOX360 etc. is present and can be used to play a game, watch a movie, view photos, etc., and the user has a desire to setup the activity preferences different per device activity mode, i.e., "Play Game", "Watch Movie", etc. When the media center PC gets selected to play a 3D game ("Play Game" in activity menu), the TV preferably goes into it's 3D mode settings, if available. When the media center PC is used to playback a BluRay movie ("Watch Movie" activity menu), the TV implements its movie watching settings and disables the 3D settings in this instance. Thus, the user of a combination device providing gaming and movie capabilities (Playstation 3, XBOX360 and others) could have separate optimized audio mode settings for each activity "Play Game" and "Watch Movie".

Figure 8:
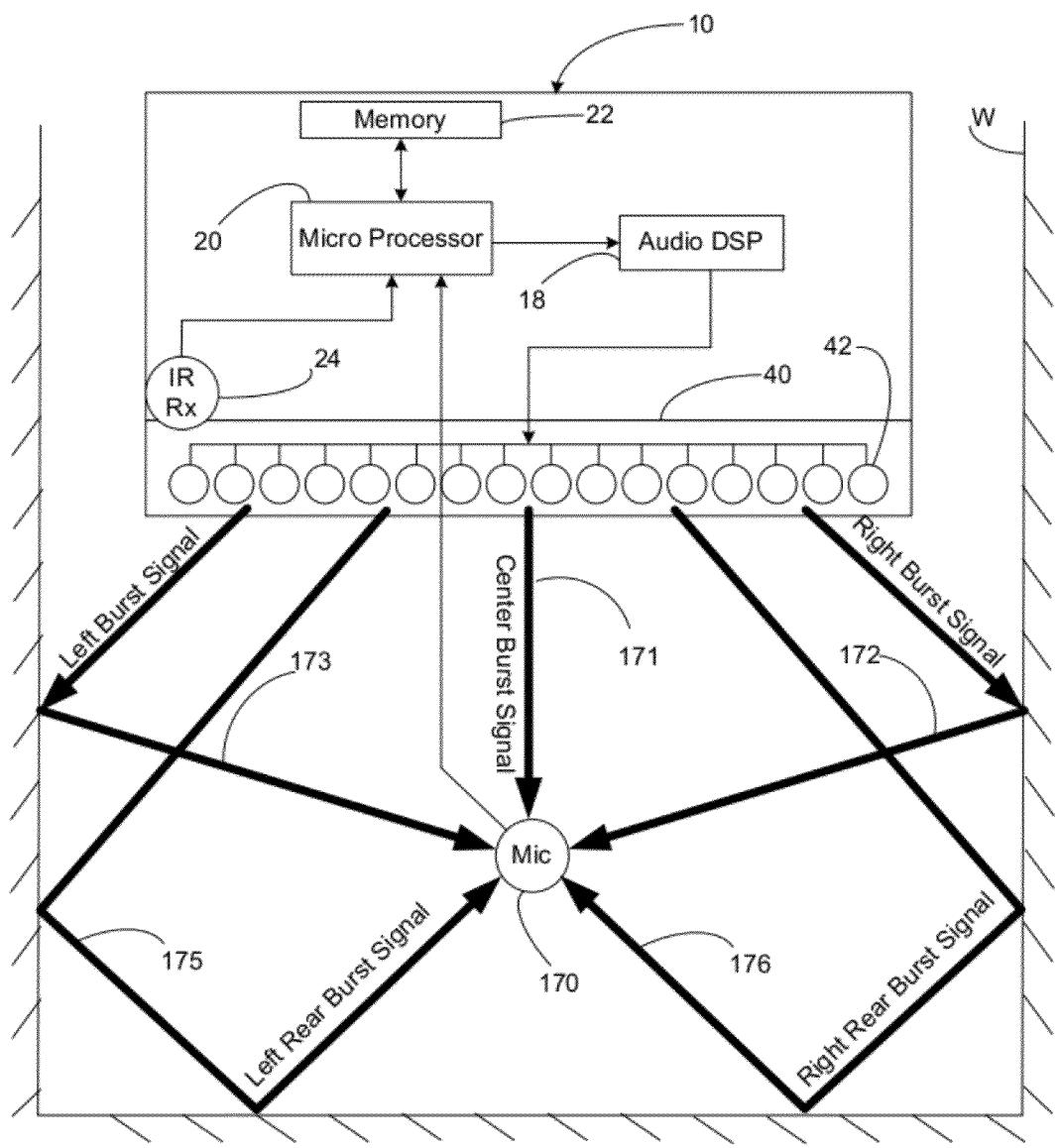
FIG. 8 depicts a schematic of a surround sound calibration process using a microphone physically coupled to the television having an integrated sound projector and control system.

Turning to FIG. 8, in order to automatically calibrate the beam sound levels, a microphone 170 is couplable to the control system 12 of the TV 10 over a wire. The microphone is used to sense or capture the average sound level sound burst signals emanating from the sound projector 40 such as, e.g., as depicted, a right burst signal 172, a left burst signal 173, a center burst signal 171, a left rear burst signal 175, and a right rear burst signal 176, and optionally a subwoofer sound burst. The sequence of sending the sound bursts for each sound beam is predefined so that the control system 12 of the TV 10 can measure the signal level synchronized with the test signals. The microphone 170 captures the average levels for each sound channel. The control system 12 will use the levels to automatically compensate each sound channel to calibrated conditions.

Figure 9:
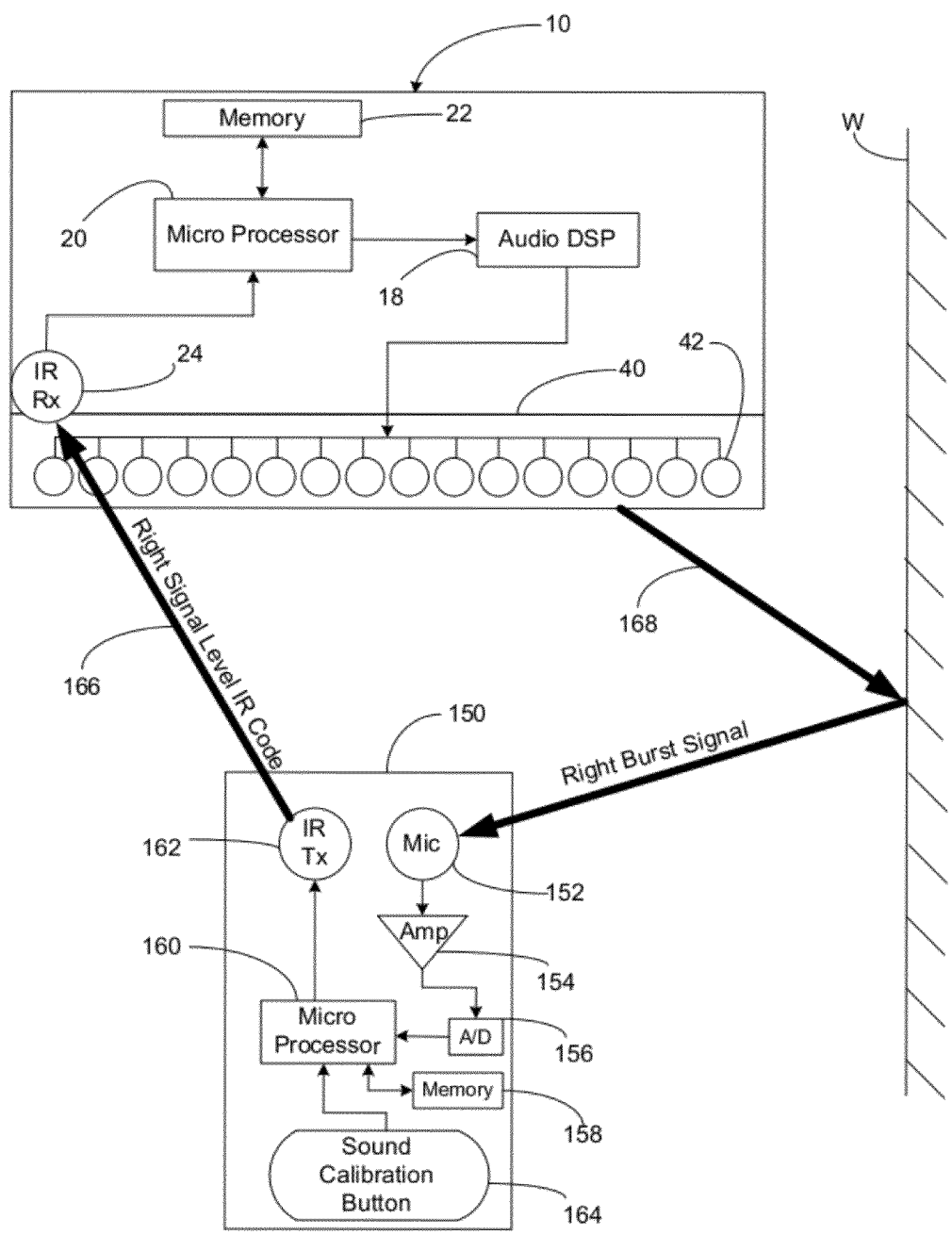
FIG. 9 depicts a schematic of a television having an integrated sound projector and control system and a television remote control unit with an embedded microphone for surround sound calibration.

Turning to FIG. 9, in an alternative embodiment, which removes some of the complexity associated with surround sound setup and calibration, a TV remote control unit 150 is equipped with an embedded microphone 152 and microprocessor 160 to measure the sound beam audio level and return it to the control system 12 of the TV 10. The remote controller 150 can measure the beam audio level when it knows the exact sequence and timing of the test signals being output from the sound projector 40 of the TV 10. It can then return the measurements back to the TV 10 through special IR codes.

Figure 10:
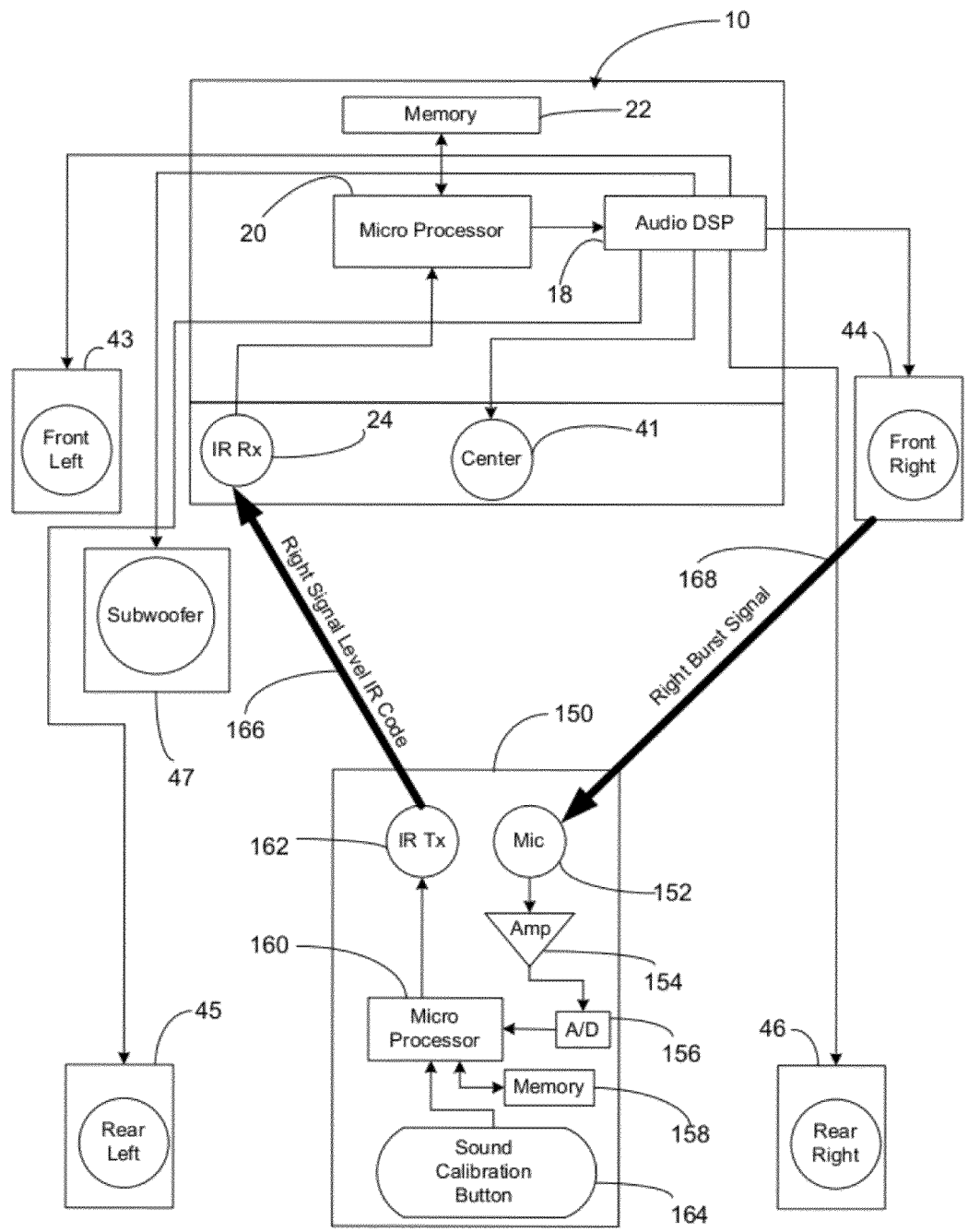
FIG. 10 depicts a schematic of a television coupled to external surround sound speakers and a television remote control unit with an embedded microphone for surround sound calibration.

The remote control 150 with embedded microphone unit can be used, as depicted in FIG. 10, to measure the audio level from discrete external surround speakers such as, e.g., center 41 (which can be, as depicted, the TV speaker), front left 43, front right 44, rear left 45, and rear right 46 speakers, and optionally a sub woofer 47.

As depicted in FIGS. 9 and 10, the remote controller 150 preferably includes an amp 154 coupled to the embedded microphone 152, an analog-to-digital converter 156 coupled to the amp 154 and the micro processor 160, non-volatile memory 158 coupled to the micro processor, and an IR transmitter 162 coupled to the micro processor 162. Software to control and operate the remote controller 150 and comprising a set of instructions executable on the micro processor 160 is preferably stored in the memory 158. In addition, the remote controller 150 can include a dedicated function key such as a sound calibration button 164 coupled to the micro processor, which when depressed causes the remote controller 150 to send a command comprising a series of instructions embedded in IR code to the TV 10 to cause the control system 12 to enter a sound calibration mode.

The TV 10 will subsequently send bursts of a test signals for each sound beam or speaker, and optionally the subwoofer. An exemplary test burst signal is depicted as a right burst signal 168. The sequence of the test signals is preferably predefined and known by both the TV 10 and the remote controller 150 such that the remote controller 150 can measure the signal level synchronized with the test signals. The remote controller 150 will capture the average levels for each sound channel and send back an IR message with the measured level. An exemplary IR code is depicted as a right signal level IR code 166. The TV 10 will use the measured levels to automatically compensate each sound channel to calibrated conditions.

As one skilled in the art would readily recognize, this process can be used for the automatic setup of audio levels and delays in surround systems with TVs that serve the AVR function and include an integral surround sound decoder and either a sound projector, a power amplifier or wireless transmitters for discrete external speakers.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A television comprising
a screen;
a sound projector;
a control system coupled to the screen and sound projector, wherein the control system causes the sound projector to project one or more sound beams into a room toward one or more target locations, and wherein the control system displays a graphical user interface on the screen, the graphical user interface including graphical representation of the projected path of the one or more sound beams and operable by a user to adjust the angles of the projected path of the one or more sound beams;
wherein the interface prompts a user to input information using a menu-driven format; and
wherein the interface prompts the user to input viewing room parameters.

2. The television of claim 1 wherein the interface prompts the user to input sound output mode selection.

3. The television of claim 1 wherein the menu-driven format includes one or more text entry areas and menu-driven choices.

4. A television comprising
a screen;
a sound projector;
a control system coupled to the screen and sound projector, wherein the control system causes the sound projector to project one or more sound beams into a room toward one or more target locations, and wherein the control system displays a graphical user interface on the screen, the graphical user interface including graphical representation of the projected path of the one or more sound beams and operable by a user to adjust the angles of the projected path of the one or more sound beams;
wherein the interface prompts a user to input information using a menu-driven format; and
wherein the interface prompts the user to input sound beam angles.

5. The television of claim 2 wherein the control system causes the output of sound in an output mode associated with a selected viewing activity.

6. The television of claim 1 wherein the viewing room parameters include a room size, a first wall size, a TV location on first wall, a second wall size, and a distance from the TV location to a sofa location.

7. The television of claim 1 further comprising a remote control unit having an embedded microphone for calibration of sound projector.

8. The television of claim 7 wherein the remote control unit comprises
an amp coupled to the embedded microphone,
an analog-to-digital converter coupled to the amp and the micro processor,
non-volatile memory coupled to the micro processor, and
an IR transmitter coupled to the micro processor.

9. The television of claim 8 wherein the remote control unit further comprises dedicated function key coupled to the micro processor to cause the transmission of an IR signal to the TV to cause the control system to enter a sound calibration mode.

10. A method comprising the steps of
prompting a user to enter a first parameter regarding room size, a second parameter regarding TV location, and a third parameter regarding viewing distance from TV,
calculating beam angles for sound beams emanating from a sound projector embedded in the TV,
drawing a first set of polygons corresponding to paths of the sound beams emanating from the sound projector, and
displaying the polygons on a screen of a TV.

11. The method of claim 10 further comprising the steps of drawing a second set of polygons corresponding to paths of the sound beams emanating from the sound projector resulting from a change in beam angles entered by a user of the TV.

12. The method of claim 11 further comprising the steps of
prompting a user to select a viewing activity,
prompting the user to select an audio mode of operation from a list of audio modes of operation including surround sound, stereo, mono targeted beam and dual target beam to be assigned to the viewing activity.

13. The method of claim 10 further comprising the steps of
receiving instructions to begin a viewing activity selected by the user,
displaying video content on the display screen in accordance with the viewing activity, and
outputting sound corresponding to the video content in accordance with the audio mode assigned to the viewing activity.

14. The method of claim 10 further comprising the steps of
receiving instructions to begin calibration of the sound projector embedded in a TV,
sending bursts of a test signals for each sound beam, and
receiving IR signals with the measured level of sound beams.

* * * * *